June 4, 1929.  C. F. BLEDSOE  1,716,025
EMERGENCY STOP MECHANISM FOR HOISTS
Filed July 28, 1925   3 Sheets-Sheet 3
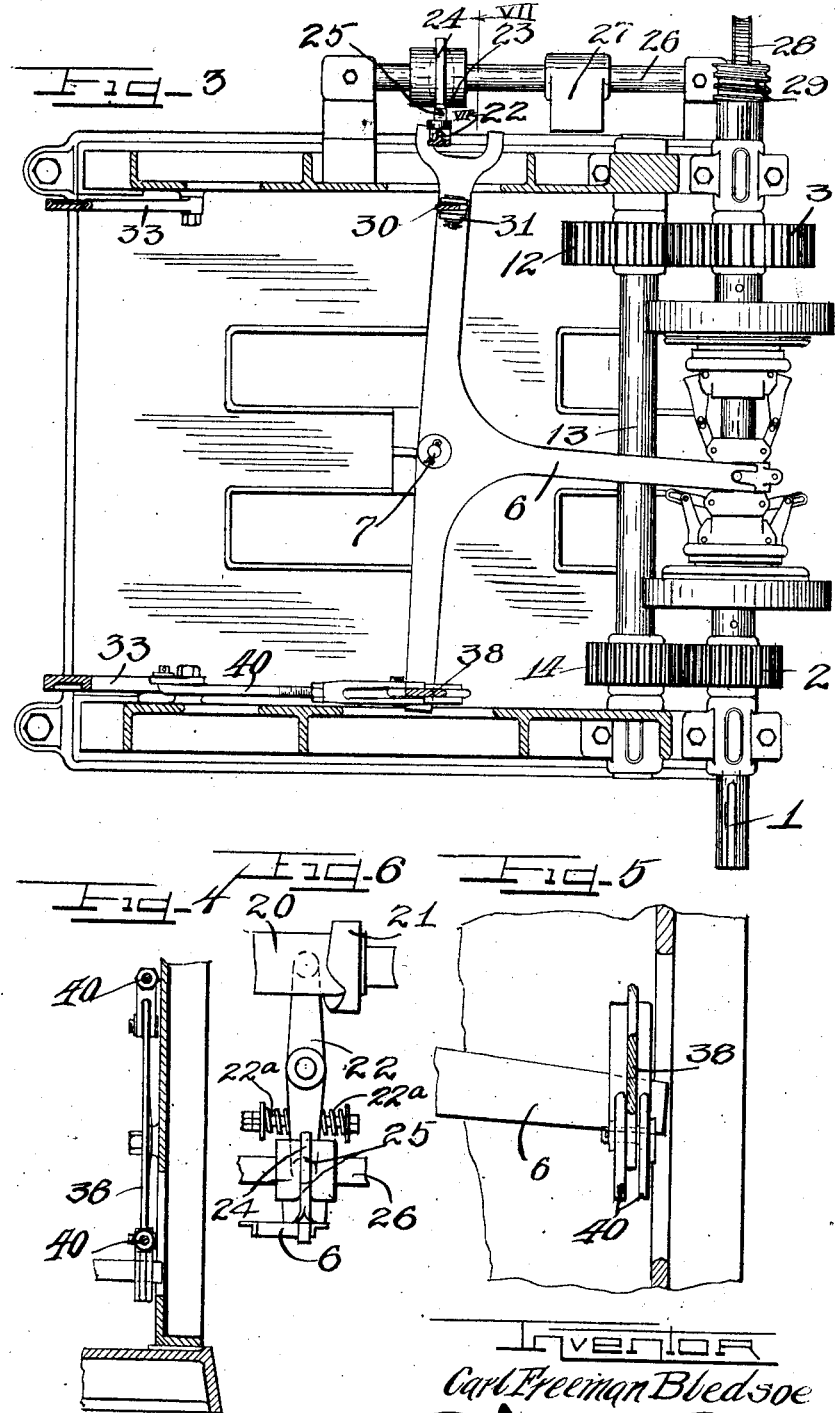
Inventor
Carl Freeman Bledsoe
by Charles... Attys.

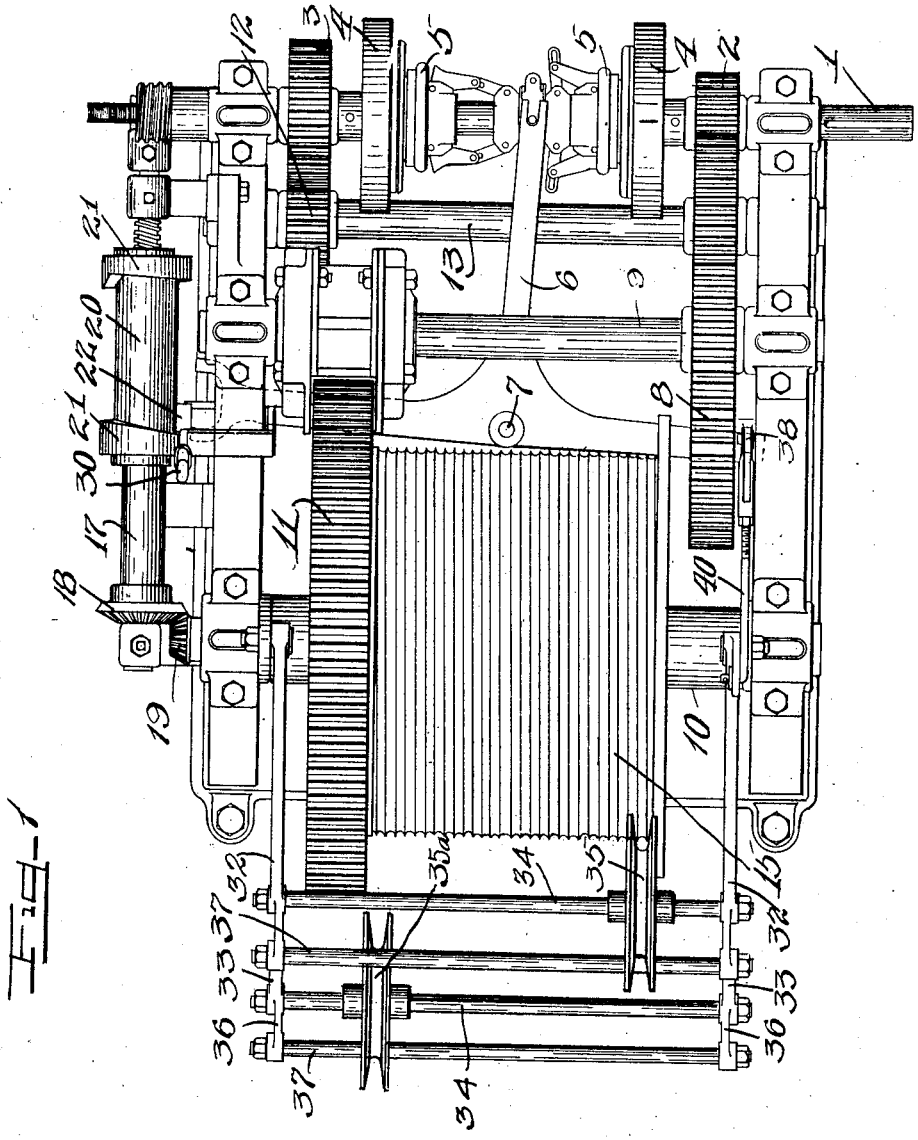

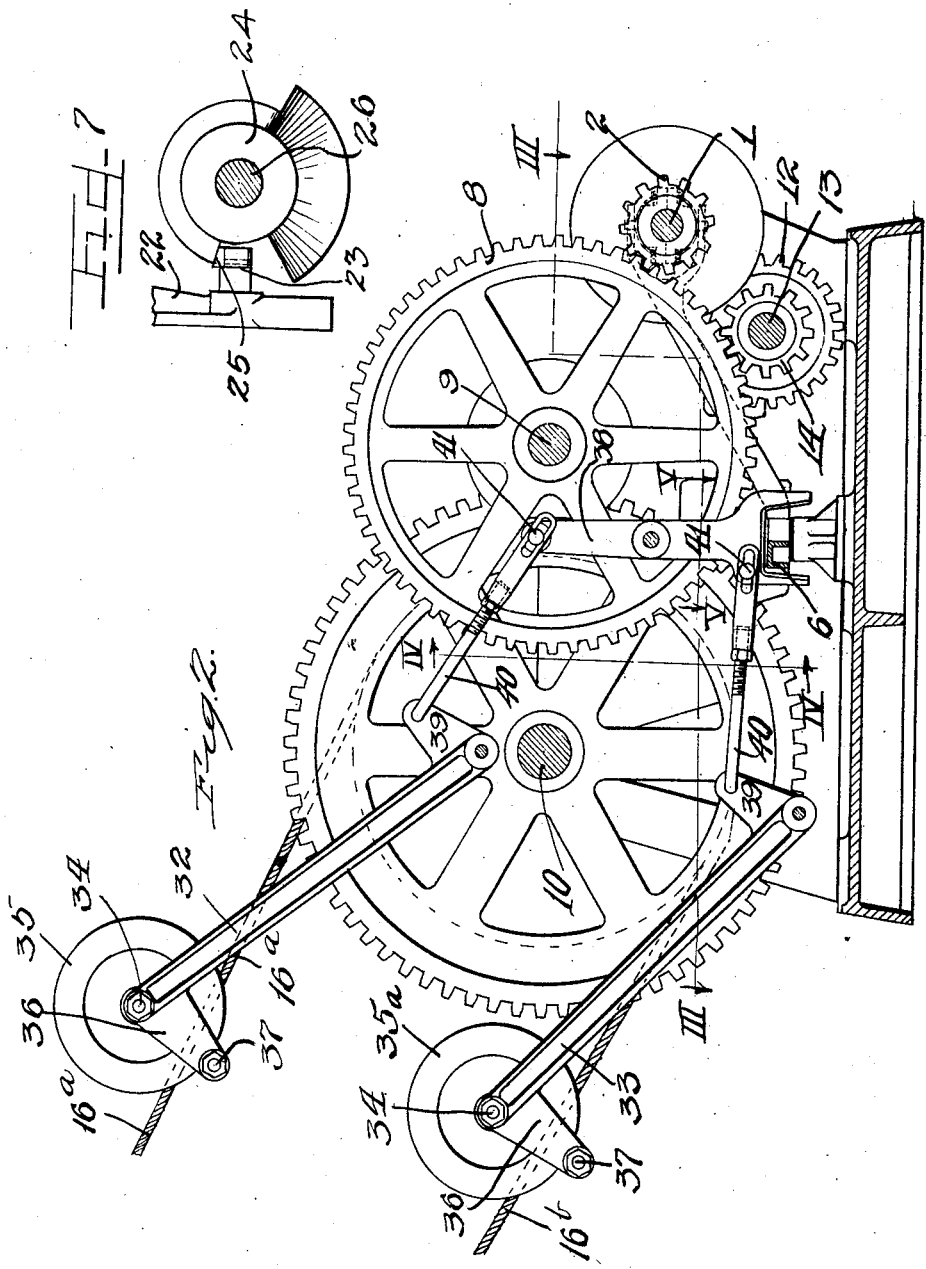

Patented June 4, 1929.

1,716,025

UNITED STATES PATENT OFFICE.

CARL FREEMAN BLEDSOE, OF CHICAGO, ILLINOIS, ASSIGNOR TO OGLE CONSTRUCTION CO., OF CHICAGO, ILLINOIS, A CORPORATION OF ILLINOIS.

EMERGENCY STOP MECHANISM FOR HOISTS.

Application filed July 28, 1925. Serial No. 46,621.

This invention relates to an emergency stop mechanism for hoisting machines of that type which automatically reverse after a predetermined number of revolutions and concerns itself primarily with mechanism controlled by the cables for shifting the reversing clutch to neutral position when a cable slackens or breaks.

The invention comprises the novel structure and combinations hereinafter described and more particularly pointed out and defined in the appended claims.

In the accompanying drawings, which illustrate a preferred form of this invention and in which similar reference numerals refer to similar features in the different views:

Figure 1 is a top plan view of a hoisting machine embodying this invention;

Figure 2 is a vertical sectional view taken longitudinally of the machine;

Figure 3 is a horizontal sectional view taken substantially upon the line III—III of Figure 2;

Figure 4 is a fragmentary view taken substantially upon the line IV—IV of Figure 2;

Figure 5 is an enlarged sectional view upon the line V—V of Figure 2;

Figure 6 is a fragmentary elevational view of certain parts, and

Figure 7 is a fragmentary side elevational view of the reversing cam taken substantially upon the line VII—VII of Figure 3.

While this invention is adapted to be applied to any hoisting machine, I have selected a certain type of machine for illustrating the application and operation of this invention.

The type of machine selected is substantially the same as is illustrated in the Powell Patent No. 1,532,202, and requires but a brief description. It comprises a main driving shaft 1 having the gears 2 and 3 loosely mounted thereon. Each gear is provided with a clutch drum 4. Between the drums 4, is a pair of reversing clutches 5 connected for simultaneous movement by a three armed or T lever 6 pivoted at the center 7 of the arms to the frame of the machine. The gear 2 meshes with a gear 8 secured upon a transverse shaft 9, which is geared to the drum shaft 10 by a gear 11 on the drum shaft and small pinion (not shown) on the shaft 9.

The gear 3 meshes with a gear 12 on an intermediate shaft 13 which carries a gear 14 meshing with the gear 8 for reversing the drum. A drum 15 is secured upon the drum shaft 10. A pair of cables $16^a$ and $16^b$ are adapted to be wound a suitable number of times around the drum and attached thereto at one of their ends. The other ends of the cables extend away from the drum for attachment to buckets, or the like.

One arm of the lever 6 is connected to the clutch mechanism; the other arms extend laterally to the sides of the machine. The end of one of these lateral arms is fork shaped, as clearly shown in Figure 3 and in dotted lines in Figure 1, for a purpose that will later appear.

Upon one side of the machine there is journalled in suitable bearings a screw shaft 17 having a bevelled pinion 18 at one end that meshes with a pinion 19 on the drum shaft. A cam sleeve 20 is screwed upon the threads of this shaft for longitudinal movement thereof. This sleeve is provided with terminal cams 21 for shifting a lever 22, which is pivoted intermediate its ends to the frame. The lower end of this lever extends between the forks of the lever 6, as shown in Figure 3. This lever 22 has an outwardly directed lug 23, the sides of which are adapted to be engaged by a cam 24 and the end of which is adapted to engage under a shoulder 25 of said cam.

The cam 24 is mounted upon a shaft 26 journalled in suitable bearings below the shaft 17. A weight 27 on this shaft normally tends to rotate the same in a direction opposed to the thrust on the shoulder 25. A worm gear 28 having a mutilated portion (not shown) is secured upon the end of the shaft 26 and meshes with a worm 29 on the driving shaft 1. When the lug on the lever 22 is engaged under the shoulder on the cam 24, the mutilated portion is directly under the worm 29 so no rotation takes place. However, when the lever 22 is shifted out of engagement with the shoulder on the cam 24, the weight 27 will rotate the shaft 26 to bring the teeth on one side of the mutilated portion into engagement with the worm 29. This operation is similar to that of the reversing shaft shown in said Powell patent.

A hand lever 30 (Figure 1) is connected to a jaw lug 31 on the lever 6 for manual operation.

During the operation of the machine, the drum shaft 10 will rotate the screw shaft 17 and shift the sleeve 20 until one of the cams 21 engages the lever 22 for shifting the same. As viewed in Figure 3, the operation will be such as to shift the lower end of said lever to the left removing the lug 23 from under the shoulder 25 of the cam 24. At the same time, the lever 6 will be shifted to bring the clutches to neutral. When the lug 23 is removed from under the shoulder 25, the shaft 26 will be rotated by the weight 27 to bring the worm gear 28 into mesh with the worm 29 on the driving shaft. The reversing shaft 26 will then rotate one revolution, the cam 24 acting against the lug on lever 22, which will shift the lever 6 to bring the other clutch into engagement for reversing the action of the drum. Lateral springs 22ª act upon the lever 22 for bringing the same back for engagement of the lug under the shoulder 24 when the cam has completed a revolution. The period of rotation of the cam 24 defines the dwell period of the drum when loading and unloading take place.

The machine thus far described forms no part of this invention except in so far as it cooperates therewith. For this reason, it has not been thought necessary to illustrate all the parts in detail.

As illustrative of this invention, two pairs of links 32 and 33 are pivoted to the sides of the machine. The links of each pair are upon opposite sides of the machine. The outer ends of each pair of links are connected by a rod 34. A guide roll 35 is slidably mounted upon one rod and a guide roll 35ª is likewise slidably mounted upon the other rod.

The upper ends of the links are provided with downwardly extending lugs or arms 36, which form supports for guide rods 37, which act as keepers for maintaining the cables which engage each roll and which pass between each roll and its guide rod, in engagement with such rolls. The rolls and links are supported in elevated position by the cables and the rolls slide on the rods 34 in accordance with the winding or unwinding of the cables. Consequently, if one of the cables slackens, the roll and link supported thereby would drop downwardly. The downward movement of either pair of links will bring the reversing clutches to neutral, as will now be explained.

In referring to Figure 2, it will be noted that a lever 38 is pivoted intermediate its ends upon the frame, at the side opposite the reversing shaft 26. The lower end of this lever is bifurcated or fork shaped for straddling one of the lateral branches of the lever 6 without interfering with the normal operation thereof. The lever 38 is hence normally disassociated with the reversing mechanism. The links 32 and 33 upon this side of the frame have upwardly extending lugs or arms 39. An adjustable link 40 is connected at one end to each arm. The other end of each link is slotted for forming a lost motion connection with a stud 41 on the lever 38. It will be noted that one stud 41 is above the pivotal point of the lever while the other is below it. Consequently, the lower end of the lever 38 will be shifted in opposite directions by the action of the different links 40.

In the position shown in the drawing, the clutch for direct drive is in operative position, and the lateral arm of the lever 6 that extends through the bifurcation is fairly close to one tine of the fork. At this time, the drum is rotating in an anti-clockwise direction, as viewed in Figure 2, and the cable 16ª that supports the links 32 will be paid out. Now should the empty bucket strike an obstruction in descending or tip or in some other way cause the cable 16ª to slacken, the links 32 will automatically drop or swing downwardly causing the upper end of the lever 38, which is connected thereto, to swing rearwardly, and the lower portion to swing forwardly for shifting the lever 6, which in turn will shift the reversing clutches to neutral position.

If the drum is rotating in a reverse direction, the lever 6 will be in such a position that the lateral arm upon this side of the machine will be adjacent the other tine of the fork on lever 38. Consequently, should the cable 16ᵇ that supports the links 33 slacken for some reason, the links 33 would swing downwardly and the lower end of the lever 38 would be shifted rearwardly drawing the lever 6 to neutral position for stopping the hoist. The slots in the links 40 allow for ordinary vibration of the cables and links during normal operation, and the fork in the lever 38 is wide enough for shifting lever 6 to operative position from neutral.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. In a hoisting mechanism, the combination with a drum, of cables supported thereon with the end portions thereof extending from the drum, a pair of swingable links supported by each cable, driving mechanism for the drum including a reversing clutch, a lever for shifting said clutch, a second lever pivoted intermediate its ends and having a bifurcated end straddling said clutch lever, and a connection between each pair of links and said second lever.

2. In a hoisting machine, a drum having a cable wound thereon, driving mechanism for the drum including a reversing clutch, a lever for reversing said clutch, automatic means controlled by said mechanism for actuating said lever, and automatic means controlled by said cable for shifting said clutch to neutral position when the cable slackens.

3. In a hoisting machine, a drum, cables wound thereon and having end portions projecting therefrom, driving mechanism for the drum including a reversing clutch, a lever for shifting said clutch, a second lever normally disassociated from said clutch lever, a swingable member supported by the end portions of each cable, and a connection between each swingable member and said second lever for actuating said second lever for shifting said clutch lever when a cable slackens.

4. In a hoisting machine, a drum, a cable wound upon said drum, driving mechanism for the drum including a reversing clutch, a lever for shifting said clutch, a member normally beyond the range of movement of said lever, and means actuated by the slackening of the cable for moving said member into contact with said lever and shifting the same to neutral position.

5. In a hoisting machine, a drum having a cable wound thereon, driving mechanism for the drum including a reversing clutch, a lever for reversing said clutch, automatic means controlled by said mechanism for actuating said lever, and automatic means controlled by the slackening of the cable for acting on said lever for shifting said clutch to neutral position, said second automatic means being unaffected by the operation of said first automatic means.

In testimony whereof I have hereunto subscribed my name.

CARL FREEMAN BLEDSOE.